(No Model.)
C. GENGNAGEL.
HORSE HITCHING DEVICE.
No. 529,487. Patented Nov. 20, 1894.
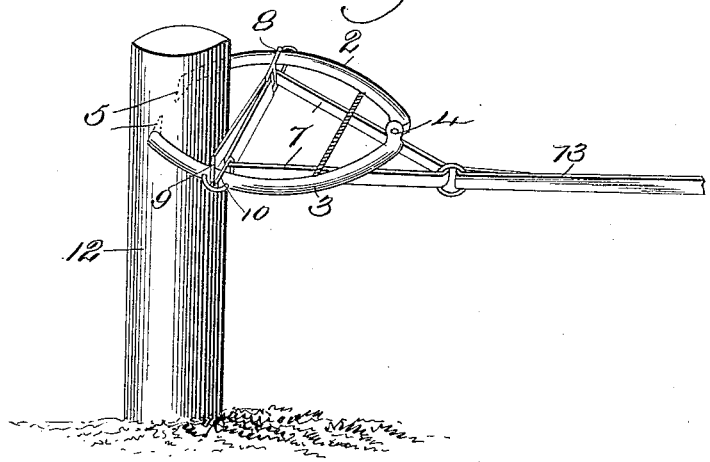
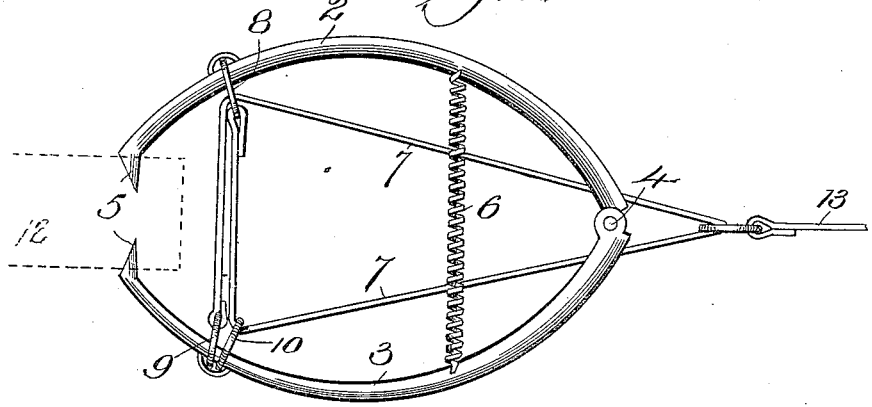
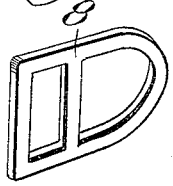
Witnesses
Inventor
Charles Gengnagel
By John Wedderburn
his Attorney

UNITED STATES PATENT OFFICE.

CHARLES GENGNAGEL, OF WABASHA, MINNESOTA.

HORSE-HITCHING DEVICE.

SPECIFICATION forming part of Letters Patent No. 529,487, dated November 20, 1894.

Application filed September 17, 1894. Serial No. 523,299. (No model.)

*To all whom it may concern:*

Be it known that I, CHARLES GENGNAGEL, a citizen of the United States, residing at Wabasha, in the county of Wabasha and State of Minnesota, have invented certain new and useful Improvements in Horse-Hitching Devices; and I do hereby declare the following to be a full, clear, and exact description of the invention, such as will enable others skilled in the art to which it appertains to make and use the same.

The purpose and intent of the present invention is the provision of a simple device whereby a horse or other animal can be readily hitched to a tree, post or other projecting device convenient at hand when it is desired to secure the animal at a required point.

The improvement consists of two oppositely deflected bars pivoted together at one end and having engaging spurs or prongs at their free ends, a spring disposed to normally press the free ends of the bars together, and a strap having its ends passed loosely through guides on one of the said bars having permanent attachment to the opposite bar, so that when the said strap is drawn upon the pronged ends of the bars will be pressed more firmly into the support or device to which the invention is applied.

The improvement also consists of the novel features and details of construction hereinafter more fully set forth and claimed, and which are shown in the accompanying drawings, in which—

Figure 1 is a view showing the application and operation of the invention. Fig. 2 is a plan view of the device on a larger scale. Fig. 3 is a detail view of one of the rings or guide loops to which one end of the strap is attached and through which the opposite end of the said strap passes loosely.

The bars 2 and 3 composing the essential elements of the device are outwardly deflected or curved between their ends and are formed from bar metal of sufficient heft to withstand the strain to which the device will be subjected when in use. These bars are pivotally connected together at one end, as shown at 4, and their opposite ends are provided with prongs or engaging spurs 5 to enter the support or structure to which the device is applied. A spring 6 is disposed and connected at its ends with the bars at a point between the ends of the latter and is designed to normally hold the upper ends of the bars together, so as to engage the spurs or prongs 5 with the support or structure to which the device is applied and hold the same in position when the tether or hitching strap is not under tension. This spring in its preferable form of construction is coiled, and its ends are inserted and passed through openings provided in the bars and clinched thereon. A strap or rope 7 has one end passed through a guide loop 8 provided on the bar 2 and attached by means of a link 9 at its end to the bar 3. The opposite end of the said strap passes through a loop or guide 10 on the bar 3 and is attached at its free end to the guide or loop 8 on the bar 2. Thus it will be seen that the free ends of the strap 7 pass through suitable guides on the respective bars and have their ends permanently attached to the opposite bars. By this construction it is obvious that a pull upon the strap or cord 7 will bring the free ends of the bars 2 and 3 more closely together. Hence, when the spurs or prongs 5 are engaged with a support or structure as 12, a pull upon the strap or cord 7 will cause the said spurs or prongs to engage more firmly with the said structure 12. The degree of pressure with which the spurs or prongs engage with the structure 12 will be proportionate to the strain or pull upon the strap 7. The spring 6 will prevent accidental displacement or detachment of the hitching device from the structure or support when the strap 7 is not subjected to strain. For economy of construction the guide or loop 8 is provided with a cross bar over which the end of the strap engaged with the loop 9 loosely passes. It has been found expedient to provide separate loops 9 and 10 for attachment of the stop to the bar 3, so as to prevent interference and rubbing of the straps in the operation of the invention.

From the foregoing the application of a hitching device is obvious. When applying the invention to the structure or support 12, the free ends of the bars 2 and 3 are separated and placed so as to span or embrace the sides of the said structure. A smart pull upon the free ends of the bars 2 and 3 will cause the spurs or prongs 5 to enter and engage with the sides of the structure or support 12 sufficiently to hold the device in place under the tension of the spring 6. The animal is hitched to the strap 7 by means of a tether or hitching strap 13. As hereinbefore stated, a pull upon the tether or hitching strap 13 will through the strap 7 cause the spurs 5 to become more firmly embedded in the structure and clamp the device with greater security upon the structure or support to which it is applied.

Having thus described the invention, what is claimed as new is—

The herein shown and described hitching device composed of two outwardly deflected bars pivotally connected at one end and having engaging spurs at the opposite end, a spring attached at its end to the sides of said bars to normally hold the free ends of the bars closed, and a strap having one end secured to a loop in one of the said bars, passing loosely through a similar loop on the other bar, back through a loop on the first bar and secured firmly at its other end to a loop on the second bar, whereby the pull upon the said strap will close and clamp the free ends of the bars upon the structure or device to which it may be applied, substantially as described.

In testimony whereof I have signed this specification in the presence of two subscribing witnesses.

CHARLES GENGNAGEL.

Witnesses:
O. H. JOHNSON,
H. WHITMORE.